(No Model.)

C. E. ALBRO.
LATHE FOR TURNING CONES AND DISKS.

No. 456,076. Patented July 14, 1891.

WITNESSES:

INVENTOR
Charles E. Albro
BY
John W. Wickersham
ATTORNEY.

UNITED STATES PATENT OFFICE.

CHARLES E. ALBRO, OF PHILADELPHIA, PENNSYLVANIA.

LATHE FOR TURNING CONES AND DISKS.

SPECIFICATION forming part of Letters Patent No. 456,076, dated July 14, 1891.

Application filed March 4, 1890. Serial No. 342,632. (No model.)

*To all whom it may concern:*

Be it known that I, CHARLES E. ALBRO, a citizen of the United States, residing in the city and county of Philadelphia, State of Pennsylvania, have invented a new and useful Improvement in Lathes for Turning Cones and Disks, which improvement is fully set forth in the following specification and accompanying drawings.

My invention relates to improvements in lathes, and has for its object the construction of a device connected therewith and adapted to hold a series of tools at equal distances from the faces of the drops of a cone-pulley being turned on the said lathes.

It further consists of the combination of parts hereinafter described.

Figure 1:
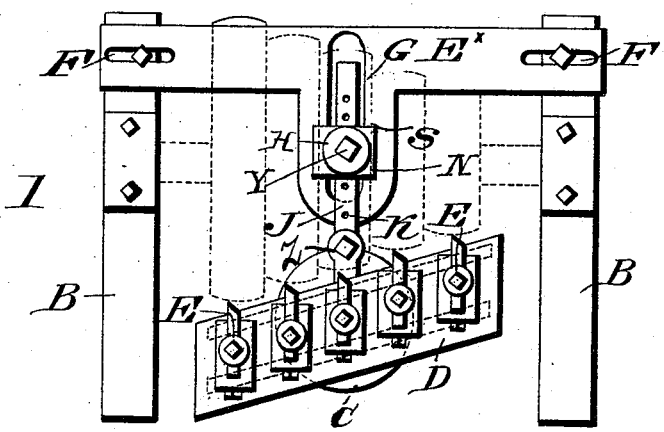
Figure 2:
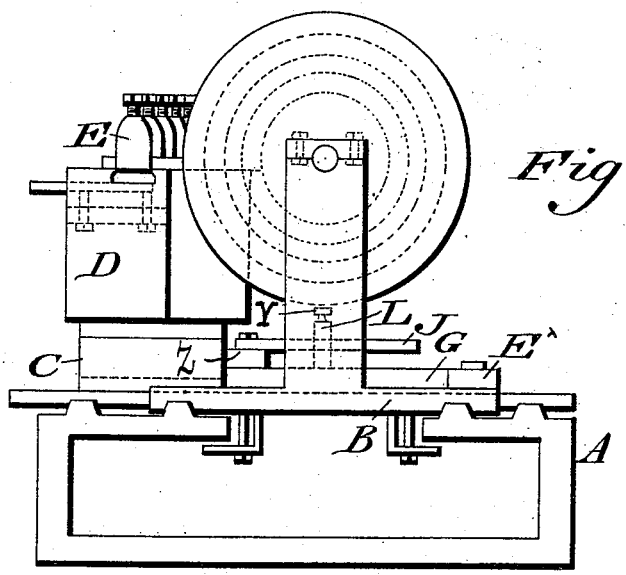
Figure 3:
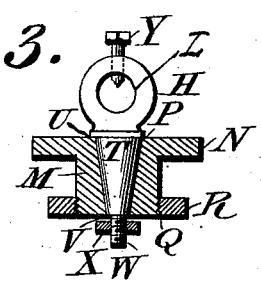

Figure 1 represents a plan view of a device embodying my invention. Fig. 2 represents a side elevation of the device shown in Fig. 1. Fig. 3 represents a vertical section, on an enlarged scale, of a detached portion of the device.

Similar letters of reference indicate corresponding parts in the several figures.

Referring to the drawings, A designates the bed of a lathe, and B housings thereof.

C designates the rest, having a head D, in which are secured the tool-posts E. The side of the head D toward the shaft on which a cone-pulley is turned is inclined, so that tools of uniform length may be used.

Secured to the housings B is a cross plate or frame $E^x$, having slots F F in its ends for the purpose of adjustment, and fastened to said frame at the central slotted portion G of the tongue-plate S thereof by an adjustable joint H is a rod J, having a series of countersinks K in its upper face, which are placed at regular intervals, so as to permit the adjustment of the rod J in an opening or eye L, hereinafter described, to feet, inches, and fractions thereof.

The adjustable joint H consists of a boss M, having a flange N and provided with a conical opening P therein, and a threaded portion Q on its lower end for a nut R, which latter bears against the under side of the tongue-plate S and is adjustable on said plate, the flange N of the boss being in contact with the upper side thereof. A tapering pin T turns in said opening P and has a shoulder U bearing against the upper face of the boss and a shoulder V and a threaded portion W on its lower end, a nut X working on said threaded portion W and bearing against the shoulder V. In the head of the said pin is an eye or opening L, through which the rod J passes and in which it is adjustably secured by means of a screw Y, which passes through an opening in the wall of the eye L and has its point engaging in a counter-sink in the rod.

To the rest C is connected a projection Z, which is clamped to the end of the pin T, so as to permit the block or rest C, with the rod J, in its movements to describe a portion of a circle, the center thereof being the pivot or joint H.

Having thus described my invention, what I claim as new, and desire to secure by Letters Patent, is—

1. In a lathe, a rest with a head having sides inclined to the axis of the mandrel and provided with a projection and a rod adjustably connected with the frame of the lathe and said projection, said parts being combined substantially as described.

2. A lathe having a frame with housings thereon, a plate having slotted ends for adjustment on said housings and provided with a central slotted tongue, a rest for supporting tool-posts, having a projection, a pin adjustable in said central slotted tongue, one end of the pin being adjustably attached to said projection, and heads on said rest with tool-holders thereon, said parts being combined substantially as described.

3. A lathe having a frame with housings, an adjustable cross-plate secured to said housings, a rest with a head having sides inclined to the axis of the mandrel, a tongue connected with said rest, and a rod having one end connected by an adjustable joint on said plate and one end to said tongue, said parts being combined substantially as described.

4. A lathe having a frame with housings, a rest with a tongue, a head with tool-holders adjustable therein and having sides inclined toward the mandrel of the lathe, a cross-plate adjustable on said housings on the frame and having a central slot, and a rod adjustably secured to a joint connected with said cross-plate, said parts being combined substantially as described.

CHARLES E. ALBRO.

Witnesses:
JOHN A. WIEDERSHEIM,
ROBT. AITON.